United States Patent [19]

Lange

[11] Patent Number: 5,642,957

[45] Date of Patent: Jul. 1, 1997

[54] TUBULAR MEMBER CONNECTOR

[76] Inventor: Fredric Lange, 13690 Elm Creek Rd., Osseo, Minn. 55369-9343

[21] Appl. No.: 555,002

[22] Filed: Nov. 9, 1995

[51] Int. Cl.$^6$ .................................................. F16B 7/04
[52] U.S. Cl. ................................... 403/297; 403/292
[58] Field of Search ................................ 403/297, 292, 403/362

[56]  References Cited

U.S. PATENT DOCUMENTS

| 2,645,509 | 7/1953 | Valenta | 403/297 |
| 3,484,830 | 12/1969 | Wagner et al. | 403/297 X |
| 3,977,800 | 8/1976 | Cassel | 403/297 X |
| 4,657,426 | 4/1987 | Targetti | 403/297 |
| 4,859,109 | 8/1989 | Targetti | 403/297 |
| 5,209,599 | 5/1993 | Kronenberg | 403/297 X |

FOREIGN PATENT DOCUMENTS

| 37131 | 1/1931 | United Kingdom | 403/297 |

*Primary Examiner*—Anthony Knight
*Attorney, Agent, or Firm*—Peterson, Wicks, Nemer & Kamrath, P.A.

[57] ABSTRACT

A connector (10) for tubular members (12, 14) is disclosed including first and second connector elements (16, 18) each having U-shaped cross sections and first and second jaw members (20, 22). A set screw (30) is threaded into the central portion (24) of the second connector element (18) intermediate the first and second jaw members (20, 22) and has an end abutting with the central portion (24) of the first connector element (16). A collar (32) encircles the first and second connector elements (16, 18) and the set screw (30) intermediate the jaw members (20, 22), with the first and second connector elements (16, 18) being biased apart by an O-ring (38) positioned between the connector elements (16, 18) and around the set screw (30). The jaw members (20, 22) can be inserted in longitudinal insertion directions into the tubular members (12, 14) and the set screw (30) threaded into the second connector element (18) to separate the jaw members (20, 22) sufficiently to grip the inside surfaces of the tubular members (12, 14) with sufficient force to prevent relative movement between the jaws members (20, 22) and the tubular members (12, 14).

21 Claims, 1 Drawing Sheet

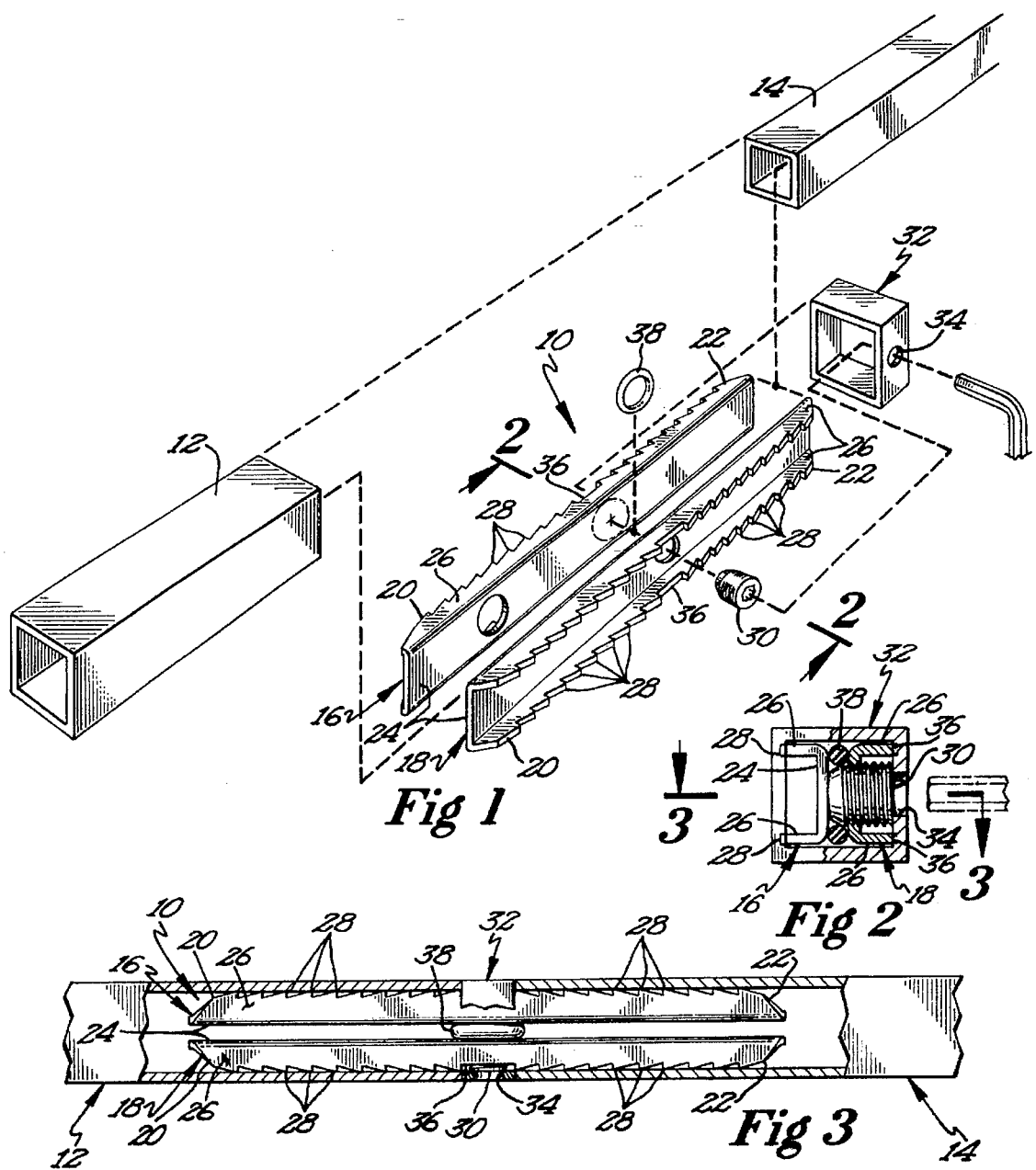

2

5,642,957

TUBULAR MEMBER CONNECTOR

BACKGROUND

The present invention generally relates to connectors, particularly to connectors for tubular members, and specifically to connectors for tubular members not requiring modifications to the tubular member, not requiring specific orientations of the tubular member, and not requiring movement in directions other than parallel to the tubular member during installation.

It is often desired to connect tubular members to various objects such as but not limited to connecting together the parallel tubes of first and second trusses to result in a single unitary truss having a span of their combined lengths. The almost universal mechanism for making such a connection is to bolt one truss to another. But in certain applications such as where it is desired to frequently connect and disconnect tubular members and/or where for aesthetic or other reasons bolts are not desired, other forms of connectors have been developed. As examples, U.S. Pat. Nos. 4,637,193 and 4,775,258 show connectors having male and female components attached by bolts to rods fastened inside of the tubular members. Thus, modification was required to the tubular members at least by fastening rods therein; due to its male/female nature, the tubular members could only be secured in corresponding orientations; and movement was required generally perpendicular to the tubular members to effect connection. Other forms of connection include connectors which slide with a friction fit in the ends of the tubular members such as shown in U.S. Pat. No. 3,469,339. However, such friction fit, slide connectors require close tolerances and were prone to allow separation when subjected to tensional forces parallel to the tubular members.

Thus, a need continues to exist for other methods to connect tubular members and which overcome the shortcomings and disadvantages of prior connecting techniques.

SUMMARY

The present invention solves this need and other problems in the field of connecting tubular members by providing, in the preferred form, first and second jaw members insertable into the tubular member in a longitudinal insertion direction and separable after insertion a distance sufficient to allow the jaw members to grip the inside surface of the tubular member with sufficient force to prevent relative movement between the first and second jaw members and the tubular member, with the separation of the jaw members being operable from outside of the tubular member.

It is thus an object of the present invention to provide a novel connector for tubular members.

It is further an object of the present invention to provide such a novel connector which does not require modification of the tubular member.

It is further an object of the present invention to provide such a novel connector which does not require particular orientations of the tubular member to allow interconnection.

It is further an object of the present invention to provide such a novel connector which does not require movement in directions other than parallel to the tubular member to effect connection.

It is further an object of the present invention to provide such a novel connector not requiring close tolerance manufacture.

It is further an object of the present invention to provide such a novel connector which securely grips the tubular member to prevent separation when subjected to tensional forces parallel to the tubular member.

It is further an object of the present invention to provide such a novel connector of a simple design of few components that can be inexpensively manufactured and assembled.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows an exploded perspective view of a connector for interconnecting first and second tubular members in a co-extensive and linear manner according to the preferred teachings of the present invention.

FIG. 2 shows a cross sectional view of the connector of FIG. 1 according to section line 2—2 of FIG. 1.

FIG. 3 shows a cross sectional view of the connector of FIG. 1 according to section line 3—3 of FIG. 2.

All figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "front", "back", "face", "outer", "inner", "upper", "lower", "height", "width", "length", "thickness", "end", "side", "axial", "radial", "longitudinal", "lateral", and similar terms are used herein, it should be understood that these terms have reference only to the structure shown in the drawings as it would appear to a person viewing the drawings and are utilized only to facilitate describing the illustrative embodiment.

DESCRIPTION

A connector for interconnecting a tubular member to another member according to the preferred teachings of the present invention is shown in the drawings and generally designated 10. In the most preferred form, connector 10 interconnects a first tubular member 12 to and generally in line with a second tubular member 14. Tubular members 12 and 14 have annular cross sections in the preferred form of a parallelepiped shape and in the most preferred form of a square shape. Tubular members 12 and 14 are typically formed of extruded aluminum.

In the most preferred form, connector 10 includes a first connector element 16 and a second connector element 18 formed separately from connector element 16. Each connector element 16 and 18 includes first and second jaw members 20 and 22 integrally connected together and extending along a straight line. In the most preferred form, elements 16 and 18 have generally U-shaped cross sections including a flat central portion 24 having a length generally equal to the width dimension of tubular members 12 and 14 and for slideable receipt within the inside surfaces of tubular members 12 and 14. First and second legs 26 upstand generally perpendicular to and on opposite sides of central portion 24, with the height of legs 26 above central portion 24 being equal to less than one-half of the height dimension of tubular members 12 and 14. The free edges of legs 26 of jaw members 20 and 22 are cut to define teeth 28. In the most preferred form, elements 16 and 18 are formed of material having a hardness greater than tubular members 12 and 14 and in the most preferred form is formed of steel.

Connector 10 according to the teachings of the present invention generally include provisions for changing the spacing between connector elements 16 and 18 to separate the pairs of jaw members 20 and 22, with such provisions being operable from outside of tubular members 12 and 14. In the preferred form, a set screw 30 extends between connector elements 16 and 18 and in the most preferred form is threadably received in connector element 18 between jaw members 20 and 22. Set screw 30 has a first end including a recess for receipt of a tool such as an allen wrench and a second end for abutment with central portion 24 of connector element 16 intermediate jaw members 20 and 22. It can then be appreciated that by threading set screw 30 into element 18, the spacing between central portions 24 of connector elements 16 and 18 increase, with the abutment of the second end of set screw 30 with element 16 holding central portions 24 of elements 16 and 18 apart along the line defined by set screw 30. Similarly by threading set screw 30 out of element 18, central portions 24 of elements 16 and 18 can be moved together such that the spacing between central portions 24 of connector elements 16 and 18 along the line defined by set screw 30 decrease.

In the preferred form shown, suitable provisions are provided for retaining connector elements 16 and 18 as a single unit. In particular, connector 10 according to the preferred teachings of the present invention further includes a collar 32 having annular cross sections of a shape corresponding to that of the cross sections of tubular members 12 and 14. Collar 32 includes an aperture 34 formed in the upper portion and of a size allowing passage and rotation of the allen wrench or similar tool for set screw 30 but preventing passage of set screw 30 therethrough. In the most preferred form, the free edges of legs 26 intermediate jaw members 20 and 22 and coincident with set screw 30 include a portion 36 located below teeth 28 and having a shape for flushly abutting with the inside surfaces of the upper and lower portions of collar 32 and specifically which is flat in the most preferred form. Jaw members 20 and 22 of each connector element 16 and 18 in the most preferred form shown are symmetrical. Furthermore, connector elements 16 and 18 in the most preferred form are of identical construction to reduce fabrication costs, with the threaded aperture for set screw 30 added to connector element 18 and with an aperture shown for use in finishing connector element 16 added to connector element 16.

Connector 10 further includes provisions 38 for biasing connector elements 16 and 18 apart which in the preferred form is an O-ring having an inside diameter greater than the diameter of and for receipt around set screw 30. With O-ring 38 in an uncompressed condition, the distance between portion 36 of connector element 16 and the first end of set screw 30 is slightly greater than the distance between the inside surfaces of the upper and lower portions of collar 32.

Now that the basic construction of connector 10 according to the preferred teachings of the present invention has been set forth, the assembly, use, and some advantages of connector 10 can be explained and appreciated. Specifically, after set screw 30 has been threaded into connector element 18, connector elements 16 and 18 are positioned with central portions 24 in a parallel relation with legs 26 of connector elements 16 and 18 extending in opposite directions and with O-ring 38 located between central portions 24 and around set screw 30. At that time, collar 32 can be slid over one end of connector elements 16 and 18 such as jaw members 22 as shown in FIG. 1. It can then be appreciated that due to the presence of O-ring 38 in the preferred form, collar 32 can be manually slid only part way onto jaw members 22 in the preferred form and particularly can not be manually slid to be positioned over portion 36 of connector element 16 and set screw 30. However, collar 32 can be pressed into position such that the sides of legs 26 are received between the inside surfaces of the side portions of collar 32, portion 36 of connector element 16 abuts with the inside surface of the lower portion of collar 32 and the first end of set screw 30 abuts with the inside surface of the upper portion of collar 32, with aperture 34 located generally concentrically around the tool recess of the first end of set screw 30 and adapted to allow access of a tool to the tool receiving recess of set screw 30. It can then be appreciated that connector 10 according to the preferred teachings of the present invention is then held together as a single unit and no loose parts or further assembly is required. By extending a tool through aperture 34 and into the recess of the first end of set screw 30, set screw 30 can be threaded into and out of connector element 18 of the assembled connector 10.

When it is desired to utilize connector 10 to interconnect to tubular member 12, set screw 30 should be threaded out of connector element 18 a distance such that teeth 28 of jaw members 20 can be slid in a longitudinal insertion direction between the inside surfaces of the upper and lower portions of tubular member 12 with the free end of tubular member 12 abutting with collar 32. At that time and while jaw members 20 are inserted into tubular member 12, set screw 30 can be threaded for movement in a direction generally perpendicular to the longitudinal insertion direction into connector element 18. It can then be appreciated that due to the abutment of the second end of set screw 30 with central portion 24 of connector element 16, as set screw 30 is threaded into connector element 18, set screw 30 forces central portions 24 of connector elements 16 and 18 to separate and holds central portions 24 apart. As the central portions 24 separate, the distance between teeth 28 of jaw members 20 increase in an amount sufficient to allow teeth 28 to engage and grip the inside surfaces of tubular member 12 in a non-slip manner and specifically with sufficient force to prevent relative movement between jaw members 20 and tubular member 12. It should be noted that due to the greater hardness of connector elements 16 and 18 than tubular members 12 and 14, teeth 28 will tend to dig into the inside surfaces of tubular member 12 to enhance the non-slip engagement of connector 10 and tubular member 12.

In the most preferred form where connector 10 interconnects tubular members 12 and 14, after tubular member 12 has been slid over jaw members 20 and prior to threading set screw 30 into connector element 18, tubular member 14 can be similarly slid in a longitudinal insertion direction over jaw members 22 with the free end of tubular member 14 abutting with collar 32 on the opposite side than tubular member 12. It can then be appreciated that when set screw 30 is threaded into connector element 18, the distance between teeth 28 of jaw members 22 also increases in an amount sufficient to allow teeth 28 of jaw member 22 to engage and grip the inside surfaces of tubular member 14 in a non-slip manner and specifically with sufficient force to prevent relative movement between jaw members 20 and 22 and tubular members 12 and 14 and thus also between tubular members 12 and 14. Thus, connector 10 of the preferred form interconnects tubular members 12 and 14 together in an aligned, generally contiguous manner.

When it is desired to remove the interconnection of tubular members 14 and/or 12 from connector 10 according to the preferred teachings of the present invention, set screw 30 can be threaded out of connector element 18. Thus, central portions 24 of connector elements 16 and 18 are not forced and held apart by set screw 30 such that teeth 28 of jaw members 20 and 22 do not engage the inside surfaces of tubular members 12 and 14 with sufficient force to prevent relative movement. Thus, tubular members 14 and/or 12 can be slid from jaw members 22 and 20, respectively, to remove tubular members 14 and/or 12 from connector 10.

It should then be appreciated that connector 10 according to the preferred teachings of the present invention is advantageous for several reasons. First, modifications to tubular members 12 and 14 are not required such as providing a threaded end, welding or similar attachment of components thereto, and the like. Additionally, interconnection and disconnection occurs by movement only in the longitudinal insertion direction and specifically there is no requirement that tubular members 12 and 14 and/or connector 10 be moved in a lateral direction and in a nonparallel direction to the longitudinal insertion direction. Further, connector 10 according to the preferred teachings of the present invention provides a clean interconnection surface with the outer peripheries of tubular members 12 and 14 and specifically does not include any protuberances extending beyond the outer peripheries of tubular members 12 and 14 such as would be the case with a head and nut in a conventional bolt-type connection. Furthermore, as tubular members 12 and 14 always provide the female component of the interconnection, no particular orientation of tubular members 12 and 14 is required as either end of tubular members 12 and 14 can be utilized for interconnection. Additionally, tubular members 12 and 14 can be formed by standard techniques such as extrusion with normal tolerances and the components of connector 10 need not be formed with close tolerance manufacture such as would be required in sliding friction fit type connections. It should further be appreciated that set screw 30 and O-ring 38 are readily available, commercially standard parts, that collar 32 is formed by cutting an extruded tube, and connector elements 16 and 18 are fabricated from an identical metal stamping. Thus, connector 10 according to the preferred teachings of the present invention is of a simple design of few components that can be inexpensively manufactured and assembled. Furthermore, connector 10 interconnects and securely grips tubular members 12 and 14 to prevent separation when subjected to forces from any direction including but not limited to tensional forces parallel to tubular members 12 and 14.

Now that the basic teachings of the present invention have been explained, many extensions and variations will be obvious to one skilled in the art. For example, the shapes of the annular cross sections of tubular members 12 and 14 and/or of jaw members 20 and 22 and other components of connector 10 can take other forms according to the teachings of the present invention.

Likewise, although connector 10 of the preferred form interconnects tubular member 12 generally coextensive and in alignment with tubular member 14, connector 10 according to the teachings of the present invention can provide other forms of interconnection. For example, jaw members 20 and 22 could be arranged at a non-linear angle. Although it would then be unable to fabricate connector elements 16 and 18 from a identical metal stamping, it may be desired in certain applications to interconnect tubular members 12 and 14 at non-linear angles. Further, connector 10 can be arranged to interconnect tubular member 12 to more than one further tubular member 14 or to other types of members such as horizontal or vertical support panels. For example, connector elements 16 and 18 could have jaw members 20 and 22 arranged in a Y, X, or other shape according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. Connector for a tubular member having annular cross sections, an inside surface, and a free end, comprising, in combination: first and second jaw members insertable into the tubular member in a longitudinal insertion direction through the free end; means for biasing the first and second jaw members apart; and means for separating the first and second jaw members while inserted into the tubular member a distance sufficient to allow the jaw members to grip the inside surface of the tubular member with sufficient force to prevent relative movement between the first and second jaw members and the tubular member, with the separating means being operable from outside of the tubular member, wherein the separating means comprises a screw extending between the first and second jaw members, with the threading of the screw causing the first and second jaw members to separate, and wherein the biasing means comprises an O-ring positioned between the first and second jaw members and around the screw.

2. The connector of claim 1 wherein the screw is threaded for movement in a direction generally perpendicular to the longitudinal direction.

3. The connector of claim 2 wherein the screw is threaded in the second jaw member and has a first end which abuts with the first jaw member.

4. The connector of claim 3 wherein the first and second jaw members are formed from separate parts; and wherein the connector further comprises, in combination: means for retaining the first and second jaw members as a single unit.

5. The connector of claim 4 wherein the screw has a second end opposite to the first end; and wherein the retaining means comprises, in combination: a collar having a first surface for abutting with the first jaw member opposite to the second jaw member and a second surface for abutting with the second end of the screw.

6. The connector of claim 5 wherein the second end of the screw includes a tool receiving recess; and wherein the second surface of the collar includes an opening adapted to allow access of a tool to the tool receiving recess but preventing passage of the screw therethrough.

7. The connector of claim 5 further comprising, in combination: a third jaw member and a fourth jaw member, with the first and third jaw members being integrally connected and the second and fourth jaw members being integrally connected and separately formed from the first and third jaw members, with the third and fourth jaw members being insertable into another tubular member, with the separating means simultaneously separating the third and fourth jaw members to allow the third and fourth jaw members to grip the inside surface of the other tubular member to prevent relative movement between the third and fourth jaw members and the other tubular member and also between the tubular members, with the screw being threaded intermediate the second and fourth jaw members.

8. The connector of claim 7 wherein the first and third jaw members and the second and fourth jaw members extend along a straight line.

9. The connector of claim 1 further comprising, in combination: a third jaw member and a fourth jaw member, with the first and third jaw members being integrally connected and the second and fourth jaw members being integrally connected and separately formed from the first and third jaw members, with the third and fourth jaw members being insertable into another tubular member, with the separating means simultaneously separating the third and fourth jaw members to allow the third and fourth jaw members to grip the inside surface of the other tubular member to prevent relative movement between the third and fourth jaw members and the other tubular member and also between the tubular members.

10. The connector of claim 9 wherein the first and third jaw members and the second and fourth jaw members extend along a straight line.

11. The connector of claim 1 wherein the first and second jaw members are formed from separate parts; and wherein the connector further comprises, in combination: means for retaining the first and second jaw members as a single unit.

12. Connector between first and second tubular members each having annular cross sections, an inside surface, and a free end, comprising, in combination: first and second jaw members insertable into the first tubular member in a longitudinal insertion direction through the free end; a third jaw member; a fourth jaw member, with the first and third jaw members being integrally connected and the second and fourth law members being integrally connected and separately formed from the first and third jaw members, with the third and fourth jaw members being insertable into the second tubular member in the longitudinal insertion direction through the free end; means for separating the first and third jaw members from the second and fourth jaw members while inserted into the first and second tubular members a distance sufficient to allow the law members to grip the inside surfaces of the first and second tubular members with sufficient force to prevent relative movement between the jaw members and the first and second tubular members, with the separating means being operable from outside of the tubular members; a collar for retaining the first, second, third and fourth jaw members as a single unit, with the collar having a first surface for abutting with the first jaw member opposite to the second jaw member; wherein the first and third jaw members and the second and fourth jaw members each have generally U-shaped cross sections including a central portion and first and second legs upstanding from the opposite sides of the central portion, with the central portions being in a parallel relation with the legs of the first and third jaw members extending in the opposite direction to the legs of the second and fourth jaw members, with the legs intermediate the first and third jaw members including a portion for flushly abutting with the first surface of the collar.

13. The connector of claim 12 wherein the first jaw member and the third jaw member are symmetrical, with the first and third jaw members being identical to the second and fourth jaw members.

14. The connector of claim 12 wherein the legs have free edges cut to define teeth to enhance non-slip engagement with the tubular member.

15. Connector for a tubular member having annular cross sections, an inside surface, and a free end, comprising, in combination: first and second jaw members insertable into the tubular member in a longitudinal insertion direction through the free end; and means for separating the first and second jaw members while inserted into the tubular member a distance sufficient to allow the jaw members to grip the inside surface of the tubular member with sufficient force to prevent relative movement between the first and second jaw members and the tubular member, with the separating means being operable from outside of the tubular member; wherein the first and second jaw members each have generally U-shaped cross sections including a central portion and first and second legs upstanding from the opposite sides of the central portion, with the central portions of the first and second jaw members being in a parallel relation with the legs of the first jaw member extending in the opposite direction than the legs of the second jaw member.

16. The connector of claim 15 wherein the legs have free edges cut to define teeth to enhance non-slip engagement of the free edges with the tubular member.

17. The connector of claim 15 wherein the annular cross sections of the tubular member are parallelepiped in shape having a height and a width; and wherein the central portions have a length generally equal to the width of the tubular member, with the legs upstanding from the central portions to less than one-half of the height of the tubular member.

18. The connector of claim 15 wherein the first jaw member and the third jaw member are symmetrical, with the first and third jaw members being identical to the second and fourth jaw members.

19. The connector of claim 15 wherein the first and second legs upstand generally perpendicular from the opposite sides of the central portion.

20. The connector of claim 15 wherein the first and second jaw members are stamped to fabricate the generally U-shaped cross sections.

21. The connector of claim 15 wherein the legs have free edges which engage and grip the inside surface of the tubular member.

* * * * *

UNITED STATES PATENT AND TRADEMARK OFFICE
CERTIFICATE OF CORRECTION

PATENT NO. :  5,642,957
DATED :  July 1, 1997
INVENTOR(S) :  Fredric Lange It is certified that error appears in the above-identified patent and that said Letters Patent is hereby corrected as shown below:

Column 7, line 38, cancel "law" and substitute therefor --jaw--.

Column 7, line 45, cancel "law" and substitute therefor --jaw--.

Signed and Sealed this

Fourth Day of November, 1997

*Attest:*

BRUCE LEHMAN

*Attesting Officer*   *Commissioner of Patents and Trademarks*